Figure 1:
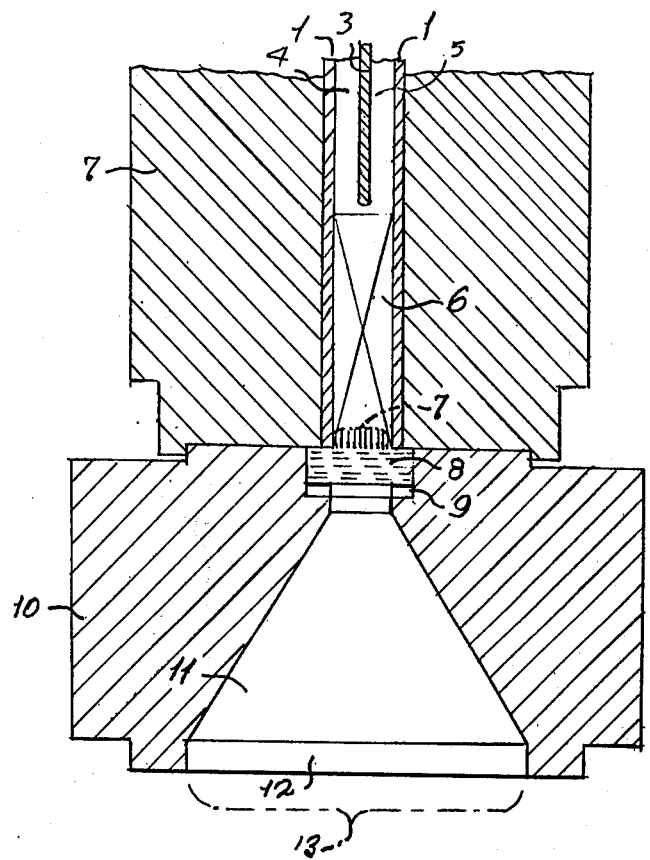

United States Patent [19]
Fontijn

[11] 3,950,476
[45] Apr. 13, 1976

[54] MANUFACTURE OF UNIQUE SYNTHETIC FILM AND YARN

[75] Inventor: Wilhelmus Johannes Fontijn, Dieren, Netherlands

[73] Assignee: Akzona Incorporated, Asheville, N.C.

[22] Filed: Feb. 5, 1973

[21] Appl. No.: 329,315

Related U.S. Application Data
[63] Continuation of Ser. No. 751,447, Aug. 9, 1968, abandoned.

[30] Foreign Application Priority Data
Aug. 19, 1967 Netherlands ................ 6711464

[52] U.S. Cl. .............. 264/171; 156/244; 264/49; 264/174; 264/DIG. 47
[51] Int. Cl.² ........................................ B29F 3/12
[58] Field of Search ............ 264/171, 174, DIG. 47, 264/49; 156/244; 161/175

[56] References Cited
UNITED STATES PATENTS

| | | | |
|---|---|---|---|
| 3,051,453 | 8/1962 | Sluijters | 259/4 |
| 3,239,197 | 3/1966 | Tollar | 259/4 |
| 3,444,031 | 5/1969 | Schrenk | 264/171 |
| 3,485,912 | 12/1969 | Schrenk et al. | 264/171 |
| 3,565,985 | 2/1971 | Schrenk et al. | 264/171 |

Primary Examiner—Jeffery R. Thurlow
Attorney, Agent, or Firm—Craig & Antonelli

[57] ABSTRACT

A synthetic film which comprises at least two unmixed polymeric components, at least one of the components occurring in the form of substantially endless threads in the longitudinal direction of the film. The threads have transverse dimensions that are smaller than the thickness of the film and are embedded in a basic mass of a different polymeric component.

The process for producing such synthetic films includes the steps of arranging at least two polymeric components, in the liquid state, side by side in a particular order to form a single main stream; repeatedly dividing and doubling the main stream into a multi-layer stream; temporarily dividing the multi-layer stream in a direction transverse to the direction of the layers at least once into sub-streams on the order of magnitude of the layer thicknesses in situ, while retaining the continuity of flow of the multi-layer stream and then extruding the resulting stream containing a plurality of the sub-streams through a casting slit to form said film.

Yarns and the like fibrillary products having a low fibril denier count are obtained from these films by removing the basic mass, e.g., by use of solvents or special heat treatment.

6 Claims, 2 Drawing Figures

U.S. Patent   April 13, 1976   3,950,476

MANUFACTURE OF UNIQUE SYNTHETIC FILM AND YARN

CROSS REFERENCE TO RELATED APPLICATION

This application is a Continuation of application Ser. No. 751,447, filed Aug. 9, 1968, which is now abandoned.

This invention relates to the manufacture of synthetic films, sheets, yarns and the like products containing at least two unmixed polymeric components. More particularly, the invention relates to a process for the manufacture of synthetic films, sheets or the sheet-like products, as well as a process for producing from these sheet-like products filament yarns, spun yarns, and threads, and to the products obtained from these processes.

Synthetic film made up of the two unmixed polymeric components is described in applicant's copending application Ser. No. 743,894 filed on July 10, 1968 now abandoned. The present invention is directed to a film of the same type but which, advantageously, has different unique properties and applications due to arrangement of its components.

Thus, this invention contemplates a synthetic film or sheet containing at least two unmixed polymeric components which is further characterized in that at least one of the components occurs in the form of substantially endless or continuous threads in the longitudinal direction of the film, the threads have transverse dimensions that are at least a few times, for instance at least two to five times, smaller than the thickness of the film, and the threads are embedded in a basic mass of a different polymeric component.

It will be understood that the term "endless" as used herein is to mean endless in the practical sense, e.g., an endless or continuous filament.

In a preferred embodiment of the invention the endless threads or filaments have a diameter of the order of from 0.1 to 12 $\mu$. It is particularly preferred, however, that the diameter of the endless threads should be larger than 0.5 $\mu$.

This invention also is concerned with sheets of the above type which have a thickness in the range of from, for instance, 0.5 mm. to a few millimeters and contain endless threads less than 500 $\mu$ in diameter. It will also be appreciated that the invention is not limited, however, to sheets and endless threads having the aforementioned thicknesses and diameters.

The film or sheet of this invention is reinforced with the endless threads (which may have a higher specific strength than the basic mass portion) so that, expecially after drawing, the film or sheet may have a high strength. Consequently, the film is very suitable to be used for packing relatively large weight units of powdered or granular materials such as cereals, cement, artificial or treated manure, etc.

In addition, this invention also contemplates a process for the manufacture of the heretofore described synthetic film or sheet wherein at least two polymeric components, while in the liquid state (usually molten), are arranged side by side in a selected or particular order to form a single main stream, the main stream is repeatedly divided and doubled into a multi-layer stream, and is then extruded through a casting slit; further characterized in that, before or during extrusion through the casting slit and while retaining its continuity in the direction of the flow, the multi-layer stream is, in a direction transverse to the layers, temporarily divided at least once into sub-streams of the order of magnitude of the layer thicknesses in situ, i.e., the sub-streams have thicknesses on the order of magnitude of the layer thicknesses at the place or at the time of being temporarily divided.

Advantageously, the film according to the invention may (in one of several ways) be processed into yarns or threads. Yarns that are very suitable for a number of applications may be obtained in a simple manner by dividing the film into a large number of ribbons which extend in the longitudinal direction of the film.

In accordance with this invention a particularly attractive yarn or thread is obtained by removing the basic mass from the film, or sheet, or from the ribbons made therefrom. Removal of this mass may be effected by the application of, for instance, a solvent for the basic mass or a special heat treatment, e.g., heating the film or sheet to a temperature below the melting point of the threads but above the melting point of the basic mass. The filament yarn or spun yarn thus obtained consists of filaments which may have a count that is lower than approximately 1 denier. The filaments or the fibers may have a diameter of the order of from 0.1 to 12 $\mu$, but preferably larger than 0.5 $\mu$.

Since hitherto it has not been possible to make threads of such a low denier, it is to be expected that various applications can be found for such threads.

Yarn of such a low filament denier has a special handle. As a result, the yarn is very suitable for application in relatively fine textile products. Because of its small filament diameter, such yarn cannot be spun by the conventional process in which each filament is extruded through an orifice in a spinneret plate. These fine-count yarns also appear to be very suitable for the manufacture of filament sheets. By starting from a film of the invention, filament yarns of a very low filament denier can be manufactured in an economic manner. If desired, the filament yarns may be reprocessed into fibers or spun yarns.

Figure 2:
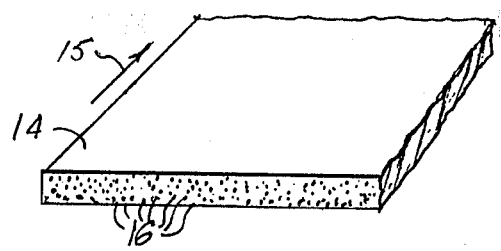

The invention will be further described with reference to the accompanying schematic drawings, in which:

FIG. 1 shows an apparatus for the casting of films according to the invention; and FIG. 2 is a perspective view of a film of this invention.

The apparatus shown in FIG. 1 is for the casting of bicomponent films. Using a separate pump (not shown) for each of the two polymer components, the polymer stream is, in the usual manner and while under pressure, forced downwards through a channel 1 in the housing 2. The channel 1 is divided into two compartments 4 and 5 by a partition 3, the one polymer or components flowing through the compartment 4 and the other through the compartment 5, so that at the end of the partition 3 the two components will form two layers. Under the partition 3 at a short distance therefrom there are positioned in the channel 1 a number of schematically shown mixing elements 6 which are so constructed that when passing therethrough the initially two-layered main stream in the channel 1 is repeatedly divided and doubled so that it leaves the last mixing element in the form of a multi-layer stream. The direction of the layers after they have left the mixing elements is schematically shown by lines 7. In reality the number of layers is many times larger than shown in the drawing. The mixing elements are preferably of the multiflux type described in Netherlands Pat. application No. 103,356, and which are also of the type described and illustrated in the copending application of Jan M. Woestenenk, Ser. No. 582,642, filed on Sept. 28, 1966 now abandoned.

Immediately after leaving the mixing elements 6 the multi-layer polymer stream is passed through a gauze pack 8 which, starting from the top, may be built up as follows:

1 gauze having 60 meshes per linear inch (60 mesh);
2 gauzes having 325 meshes per linear inch (325 mesh); and
1 gauze having 60 60 per linear inch.

When passing through the gauze pack 8, and while retaining its continuity in the direction of flow, the multi-layer polymer stream is, in a direction transverse to the direction of the layers, repeatedly divided into sub-streams of the order of magnitude of the layer thicknesses in situ. Under the influence of surface tension and viscous forces, the sub-streams, after passing through the gauzes, do not re-unite into a layered structure, but for the greater part assume a virtually or substantially circular cross-section. This leads to the formation of a large number of streams of threads in the spinning mass. The gauze pack 8 is by means of a packing ring 9 kept confined between the housing 2 and the extruder die 10 attached to the housing.

After leaving the gauze pack 8 the polymer stream flows into a space 11 in the extruder die 10 attached to the housing 2. The space 11 gradually widens in the plane of the drawing and ends in a casting slit 12, the length of which is referred to by reference numeral 13. Perpendicular to the plane of the drawing the width of the casting slit 12 may be approximately 0.3 mm. The apparatus is consequently so constructed that in longitudinal direction the casting slit 12 extends substantially perpendicular to the planes of the layers 7; although it is not necessary for the casting slit to be at a particular angular position relative to the layers.

After passing through the casting slit 12 there is formed a film 14 (shown in FIG. 2) which consists of a basic mass of the one component in which the other component forms a large number of endless threads 16 (indicated by stippling in FIG. 2) which extend in the longitudinal direction 15 of the film.

The resulting film 14 may be cut into a large number of ribbons which extend in the longitudinal direction 15 of the film and of the endless threads 16. Each ribbon may measure, for instance, 0.5 mm in width. The films will generally have a thickness in the range of from 10 to 100 $\mu$. If the endless threads each have a diameter of, say, 1$\mu$ (i.e., one micron, which equals 0.001 mm), then each ribbon will consist of a basic mass in which a large number of endless threads are embedded. Thus, the entire or partial removal from a film or a ribbon of the basic mass will lead to the formation of a filament yarn having a particularly low filament denier. Alternatively, the ribbons as such may be used as yarn. Owing to the presence of endless fibrils in the second component the properties of such a yarn will, of course, differ from those of yarn entirely consisting of the basic mass.

In preparing one embodiment of the film of this invention in an apparatus as illustrated in the drawings, use was made of two components, one of which was polypropylene having a relatively low modulus of elasticity and the other a polyester with a high modulus of elasticity. The resulting film consisted of a basic mass of polypropylene containing a very large number of endless polyester threads. The weight ratio of components used was 80 percent polypropylene and 20 percent polyester.

It will be appreciated that within the scope of the invention modifications may be made. For instance, each component may consist of a mixture of two or more polymers, and instead of the gauze pack use may be made of a grid. It should also be recognized that in the apparatus shown in FIG. 1, in which the gauze pack is located immediately after the mixing elements 6, the casting slit 12 may, if desired, be made to extend in longitudinal direction parallel to the layers 7.

It is also possible in accordance with this invention to have the gauze pack in a different place, for instance, at a short distance from the casting slit. It is then preferred that the casting slit should be made to extend parallel to the layers formed in the mixer. For in that case, if the casting slit should extend in longitudinal direction perpendicular to the layers formed in the mixer, the number of mixing elements required to obtain the same fine distribution of the endless threads would be higher than in the case of the other embodiments of the apparatus.

It will be appreciated that many combinations of polymeric spinning components may be used to prepare the film and yarn products of this invention. The most appropriate combination will depend on the intended application. Exemplary of some possible combinations of the components are nylon and polypropylene; nylon and polyethylene; nylon and polyester; nylon and polystyrene; polyacrylonitrile and polyvinyl alcohol; nylon, polyester and copolyester amides; nylon, a copolyamide, e.g., one prepared from nylon 6 and nylon 11, and polystyrene; and the like.

Moreover, it will be appreciated that the relative weight proportions of each of the polymeric components within the resulting film or sheet is dependent, to a great extent, on its intended application. For example, films of two components such as nylon and polyethylene, with weight ratios varying from about 50:50 to about 90:10, may be used to produce yarns and the like fibrillary products in accordance with this invention.

Also, the yarns produced by this invention may be made into yarn beds or webs which can be further treated to reduce the coherence of the yarns, e.g., by blowing with air, and/or to form bonded non-woven layered materials by the addition of a binder such as rubber latex.

Also, a number of solvents have been found suitable for selectively removing the basic mass from the films in accordance with the invention. These solvents include various organic compounds. For example, aromatic hydrocarbons such as benzene, toluene, or xylene are particularly effective for removing components such as polyethylene or polystyrene from a bicomponent film in which the other component is nylon 6.

It will be understood that in addition to solvent removal or heat treatment as heretofore noted, the films of this invention can also be made into a fibrillary material by subjecting them to various mechanical, chemical, or physical treatments which in themselves are known.

While the novel features of the invention have been shown and described and are pointed out in the appended claims, it is to be understood that various omissions, substitutions and changes in construction and arrangement of the features shown and described may be made by those skilled in the art without departing from the spirit and scope of the invention.

What is claimed is:

1. A process for the manufacture of synthetic film, sheet and the like sheet-like products which comprises arranging at least two unmixed polymeric components, in the liquid state, side by side in a particular order to form a single main stream; repeatedly dividing and doubling the main stream into a multi-layer stream; temporarily dividing the multi-layer stream in a direction transverse to the direction of the layers at least once into a plurality of sub-streams which do not reunite into a layered structure and which are on the order of magnitude of the layer thicknesses in situ, while retaining the continuity of flow of the multi-layer stream to thereby form a plurality of endless threads of one component embedded within a basic mass of a different component, and then extruding the resulting stream containing the plurality of the sub-streams through a casting slit, whereby a film having the endless threads of one component embedded with a basic mass of a different component is formed.

2. The process of claim 1, in which the film produced has a thickness ranging from 10 to 100 $\mu$ and the endless threads have a diameter of the order of from 0.1 to 12 $\mu$.

3. The process of claim 1, in which the transverse dimensions of the endless threads are at least two to five times smaller than the thickness of the film.

4. A process for the manufacture of synthetic film having a plurality of endless threads of one polymeric component embedded within a basic mass of a different polymeric component which comprises arranging two unmixed polymeric components in the molten state, side by side, to form a single main stream having a layer of each polymeric component extending parallel to the other; repeatedly dividing and doubling said main stream into a multi-layered stream having continuous layers of each of said polymeric components also extending parallel to each other; temporarily dividing the multi-layered stream in a direction transverse to the direction of the layers at least once into a multiplicity of continuous sub-streams having a substantially circular cross section and having a diameter on the order of magnitude of the layer thickness in situ, while retaining the continuity of flow of the multi-layer stream to thereby form a plurality of endless threads of one polymeric component embedded within a basic mass of the other polymeric component; and then extruding the resulting stream containing a multiplicity of said sub-streams through a casting slit to form said film having the endless threads of one polymeric component embedded within a basic mass of the other component therein.

5. The process of claim 4, in which the film produced has a thickness ranging from 10 to 100 $\mu$ and the endless threads have a diameter of the order of from 0.1 to 12 $\mu$.

6. The process of claim 4, in which the transverse dimensions of the threads are at least 2 to 5 times smaller than the thickness of the film.

* * * * *

UNITED STATES PATENT OFFICE
CERTIFICATE OF CORRECTION

Patent No. 3,950,476          Dated April 13, 1976

Inventor(s) Wilhelmus Johannes Fontijn

It is certified that error appears in the above-identified patent and that said Letters Patent are hereby corrected as shown below:

Column 3, line 13 should read " 1 gauze having 60 meshes per linear inch".

The following numbers printed in boldface type should be printed in standard type:

| | |
|---|---|
| "1" | Column 2, line 24; |
| "1" | Column 3, line 10; |
| "2" | Column 3, line 11; |
| "1" | Column 3, line 13; |
| "6" | Column 4, line 33; |
| "11" | Column 4, line 34; |
| "6" | Column 4, line 58. |

In the drawings, in Figure 1, the housing should be designated by reference numeral "2" rather than reference numeral "7".

Signed and Sealed this

Ninth Day of November 1976

[SEAL]

Attest:

RUTH C. MASON
*Attesting Officer*

C. MARSHALL DANN
*Commissioner of Patents and Trademarks*